United States Patent Office 3,318,750
Patented May 9, 1967

3,318,750
METHOD OF REINFORCING RUBBER ARTICLES WITH AN ADHESIVE COMPOSITION COMPRISING THE REACTION PRODUCT OF AN ALDEHYDE WITH THE REACTION PRODUCT OF TRIALKYL CYANURATE WITH A POLYHYDRIC PHENOL
Roger Gordon Aitken, St. Hilaire, Quebec, Canada, assignor to Canadian Industries Limited, Montreal, Quebec, Canada, a corporation of Canada
No Drawing. Filed Nov. 5, 1964, Ser. No. 409,288
Claims priority, application Great Britain, Nov. 25, 1963, 46,438/63
12 Claims. (Cl. 156—331)

This invention relates to the treatment of fibrous materials and more particularly to the treatment of fibrous materials to improve their adhesion to rubber.

In the manufacture of certain rubber goods such as tires, transmission belts and conveyor belts, which are subjected to severe service conditions, it has been found desirable to incoporate fibrous material, such as cord, fabrics, etc. with the rubber in order to give added strength to withstand the severe service. One of the main disadvantages to the use of the fibrous materials, and particularly synthetic materials such as polyamide and polyester fibres, in this application is their poor adhesion to rubber. When the product is subjected to loads the fibrous material separates from the rubber, causing heat generation, propagation of tears and general breakdown of the product. The problem of adhesion is particularly important in the manufacture of tires.

In Canadian Patent No. 652,487 issued on November 20, 1962, there is disclosed a method of reinforcing rubber articles with fibrous material derived from polymethylene terephthalate using a two coat adhesive system. One coat is a composition comprising triallyl cyanurate and optionally vinyl chloride; the other a composition comprising a vinyl pyridine copolymer latex-resorcinol-formaldehyde dispersion. The triallyl cyanurate is polymerized prior to bonding the coated fibres to rubber. Although this method has desirable features it suffers from the disadvantages that prolonged heating of the coated fibre is required to polymerize the triallyl cyanurate and the adhesion between the two coats is not consistently strong enough for general commercial utilization.

The known bonding agents based on polyisocyanate adhesives with which polymethylene terephthalate and nylon may be firmly bonded to rubber articles, have not found acceptance in industry for a variety of reasons, such as the toxicity of the adhesive and problems associated with solvents required for the adhesive.

It is an object of the present invention to provide a method of reinforcing rubber articles with fibrous material employing a novel adhesive. A further object is to provide a novel adhesive adapted to bond synthetic fibres to rubber. Additional objects will appear hereinafter.

The novel method of reinforcing rubber articles with fibrous material comprises applying to the fibrous material 1 an aqueous solution of the reaction product of an aldehyde and a composition derived from the reaction of an unsaturated aliphatic ester of cyanuric acid and a greater than equivalent amount of a polyhydric phenol, and 2 a rubbery copolymer latex-resorcinol-formaldehyde dispersion; heating the thus coated material; embedding said coated fibrous material in vulcanizable rubber; and vucanizing the rubber. Components 1 and 2 may be mixed before application to the fibrous material or may be applied separately. Optionally component 2 may comprise the rubbery copolymer latex without addition of the resorcinol-formaldehyde ingredient.

The component 1 mentioned hereinbefore may conveniently be prepared by reacting a lower unsaturated aliphatic triester of cyanuric acid such as triallyl cyanurate with a polyhydric phenol such as resorcinol, the said phenol being present in at least six-fold molar excess of the cyanurate, and then reacting the product with an aldehyde in the molar ratio of 2:10 to 6:10 of aldehyde to total phenol.

The structure of the reaction product of the cyanurate triester and polyhydic phenol is not known with certainty but it is believed that there is at least partial breakdown of the triazine ring. It has been found that the use of an excess of polyhydric phenol in the reaction provides a water-soluble product. It is believed that the aldehyde ingredient reacts with both the reaction product of the polyhydric phenol and cynaurate triester and the excess polyhydric phenol. Both reactions employed in the preparation of component 1 are exothermic. It is convenient to dissolve the aldehyde reaction product in dilute aqueous ammonium hydroxide. The aqueous solution may contain from 5% to 60% by weight of the aldehyde reaction product.

Suitable polyhydric phenol ingredients are resorcinol, pyrocatechol, hydroquinone and pyrogallol.

Suitable aldehyde ingredients are formaldehyde and acetaldehyde.

The reaction of the cynaurate triester with the polyhydric phenol may be accelerated by the use of catalysts such as sodium metal, sodium methoxide, red lead, p-toluenesulphonic acid, calcium acetate and tetraisopropyl titanate.

The component 2 mentioned hereinbefore is an aqueous dispersion of resorcinol-formaldehyde and a rubbery copolymer latex. A suitable rubbery copolymer latex is a vinyl pyridine copolymer latex sold under the trademark "Gentac" by the General Tire and Rubber Company. This is an aqueous dispersion of a terpolymer derived from the copolymerization of 70% by weight of butadiene, 15% by weight of vinyl pyridine and 15% by weight of styrene. The dispersion normally will contain about 40% elastomer solids. Another suitable copolymer latex is "Pliolite" 2108 sold by the Goodyear Tire and Rubber Co. "Pliolite" 2108 is a styrene-butadiene rubber latex derived from the copolymerization of 29% by weight of styrene and 71% by weight of butadiene. A preferred latex is a mixture of "Gentac" and "Pliolite" 2108. Other latices such as natural and butyl rubber may also be employed. For bonding to butyl rubber, a butyl rubber latex should be used in the aforesaid component 2.

It is known to those skilled in the art to choose the rubbery latex ingredient of the adhesive to suit the type of rubber stock employed.

The adhesive composition applied to the fibrous material comprises from 5 to 50 parts by weight of component 1 and from 50 to 95 parts by weight of component 2.

The fibrous material to which this invention is applicable include the polyesters such as the polymethylene terephthalates and the polyamides such as the nylons.

By the term "polymethylene terephthalates" is meant all those polymeric esters which are obtainable by heating glycols of the series $HO(CH_2)_nOH$ where $n$ is an integer from 2 to 10, with terephthalic acid or mixtures thereof with isophthalic acid under conditions which yield the esters in a highly polymerized condition. In place of the terephthalic acid or isophthalic acid or both, an ester-forming derivative thereof, for example, an aliphatic (including cycloaliphatic) or aryl ester or half-ester, an acid halide or an ammonium or an amine salt may be used.

The polyamides are preferably those high molecular weight products obtained by reacting polyamines, and particularly the alpha, omega-diamines, such as 1,6-hexamethylene diamine, 1,5-pentamethylene diamine and 1,8-octamethylene diamine, with polycarboxylic acid, such as adipic acid, succinic acid, phthalic acid, chlorophthalic acid and the like. The polyamides may also be prepared by polymerization of amino-carboxylic acids, such as amino-caproic acid, or its lactam derivative.

The expression "rubber" used herein refers to natural and synthetic rubber. Representative synthetic rubbery polymers include the butadiene polymers. Butadiene polymers include those polymers having rubber-like properties which are prepared by polymerizing butadiene alone or with one or more other polymerizable ethylenically unsaturated compounds, such as styrene, methyl styrene, methyl isopropenyl ketone and acrylonitrile, the butadiene being present in the mixture preferably to the extent of at least 40% of the total polymerizable material. The butadiene-styrene copolymers are manufactured commercially under such names as GR-S 1000, GR-S 1500, GR-S 1600, GR-S 2000 and the like.

Other synthetic rubbers include the neoprene rubbers. Neoprene is a generic name which is applied to polymers of chloroprene and copolymers of chloroprene with dienes or vinyl compounds, in which the chloroprene comprises the predominant monomer. Iso-butylene ("butyl") rubbers may also be used.

The rubber employed will contain various additives such as those needed to effect the vulcanization. Examples of these materials include sulphur, sulphur chloride, sulphur thiocyanate, thiuram polysulphides and other organic or inorganic polysulphides. These components are preferably employed in amounts varying from about 0.1 part to 10 parts per 100 parts of rubber and preferably from 0.3 to 3 parts per 100 parts of rubber.

Vulcanization accelerators and accelerator activators may also be present, particularly when sulphur-containing compounds are employed as the vulcanizing agents. Examples of accelerators are tetramethyl thiuram disulphide, zinc dibutyl dithiocarbamate, tetramethyl thiuram monosulphide, dipentamethylene thiuram tetrasulphide, mercapto benzothiazole, hexamethylene tetramine, aldehyde-ammonia, diphenyl-guanidine, diphenylthiurea, benzothiazyl disulphide, piperedinium pentamethylene-dithiocarbamate, and lead dimethyldithiocarbamate. Such materials are preferably employed in amounts varying from about 0.01% to about 5% by weight of the rubber.

Many other materials may be included in the rubber composition such as carbon black, pigments, anti-oxidants, anti-scorch agents and the like.

The adhesive compositions of this invention may be applied to the fibrous material in any suitable manner. It is generally preferred to apply the coating by dipping the fibrous material, loose or under tension, into the adhesive compositions. The compositions can, however, also be applied by brushing or spraying. As mentioned hereinbefore, the two compositions may be mixed before application or may be applied separately. If applied separately, it is necessary that the aldehyde-cyanurate ester-condensate-containing composition be applied first. It is preferred that at least 0.1% and preferably between 2% and 10% of solid coating by weight of the fibrous material be deposited, i.e. for a two coat system, each coat of 1% to 5%; and for a one coat system, 2% to 7%. If the desired amount of coating is not obtained in one application, the composition can be applied again or as many times as desired in order to bring the amount of coating to the desired level.

After the coating has been applied to the fibrous material, it is dried and heated for a few minutes at a temperature from 150° C. to 250° C. It is desirable to maintain the fibrous material under tension during the heating in order to avoid shrinkage. When the two components 1 and 2 mentioned hereinbefore are applied separately, the coating is heated after each application. It is believed that the heating causes cross-linking of the adhesive ingredients.

The cure of the coating applied to the fibrous material can be accelerated by the use of catalytic amounts of an amine such as diethylene triamine or triethylene diamine, or a quaternary ammonium compound.

The coated fibrous material is next embedded in vulcanizable rubber and the rubber vulcanized.

When rubber articles are reinforced with synthetic fibrous materials, particularly with polyesters and polyamides, employing the methods of this invention, the reinforcing fibrous material is firmly bonded to the rubber and the reinforced rubber articles are capable of withstanding heavy duty service.

The invention is additionally illustrated by the following examples but it is to be understood that its scope is not limited to the embodiments shown therein.

*Example 1*

A reaction product of formaldehyde and a composition containing resorcinol and the reaction product of resorcinol and triallyl cyanurate was prepared as follows:

100 parts by weight of resorcinol and 24 parts by weight of triallyl cyanurate were placed in a glass flask and heated until melted. Then 0.4 part by weight of sodium metal was added in small pieces and the flask heated to 250° C. The contents of the flask were maintained at this temperature for one hour. During this time some allyl alcohol was slowly given off. The flask was then cooled to 110° C. and connected to a reflux condenser. Then 28 parts by weight of 37% aqueous formaldehyde were added slowly through the condenser over a period of 10 minutes. The contents of the flask were refluxed for an additional 10 minutes. Then a solution containing 400 parts by weight of water and 28 parts by weight of 28% aqueous ammonium hydroxide were added.

The product was a clear liquid of dark brown colour which tended to turn blue on long exposure to the air.

*Example 2*

A vinyl pyridine copolymer latex-resorcinol-formaldehyde dispersion was prepared as follows:

The following ingredients—

| | Parts by weight |
|---|---|
| Resorcinol | 22.00 |
| Water | 560.00 |
| Formaldehyde (37%) | 35.0 |
| Sodium hydroxide (5% in water) | 60.0 |
| "Gentac" | 380.0 | were weighed into a flask in the above order and allowed to stand for 24 hours at room temperature before use. "Gentac" is the trade mark for a terpolymer latex derived from

| | Parts by weight |
|---|---|
| Butadiene | 70 |
| Vinyl pyridine | 15 |
| Styrene | 15 | containing about 40% solids dispersed in water.

*Example 3*

Lengths of polymethylene terephthalate 2 ply tire cord of approximately 2500 denier and polyhexamethylene adipamide 2 ply tire cord of approximately the 1800 denier were dipped in the solution described in Example 1 diluted with six parts of water. The cord was then dried and heated for 3 minutes at 450° F. while held under tension to prevent shrinkage. After heating the samples of cord were dipped in the latex dispersion as described in Example 2 and heated to 450° F. for 1 minute while held under tension.

*Example 4*

Lengths of polymethylene terephthalate and nylon 6,6-polyamide tire cord as used in Example 3 were dipped in the latex dispersion as described in Example 2 and heated for 3 minutes at 450° F. while held under tension.

Example 5

Equal parts of the solution described in Example 1 and the dispersion described in Example 2 were mixed together. Lengths of polymethylene terephthalate and nylon polyamide tire cord as used in Example 3 were dipped in the said mixture and heated for 3 minutes at 450° F. while held under tension to prevent shrinkage.

Example 6

The cords prepared in Examples 3, 4 and 5 were tested according to A.S.T.M. D2138-62T by moulding for 8 minutes at 308° F. into an "H" block specimen of rubber stock which contained carbon black, sulphur, benzothiazole disulphide and diphenylguanidine. The test specimen had the cords embedded in the rubber for a distance of 0.25 inch. The specimen were removed from the mould, cooled and the force required to separate the cords from the rubber determined with an "Instron" tensile tester using a jaw separation rate of 12 inches per minute. The results are as follows:

TABLE I

| | Force, lbs. |
|---|---|
| Example 3—Polymethylene terephthalate cord | 28 |
| Example 3—Polyhexamethylene adipamide cord | 21 |
| Example 4—Polymethylene terephthalate cord | 15 |
| Example 4—Polyhexamethylene adipamide cord | 18 |
| Example 5—Polymethylene terephthalate cord | 22.5 |
| Example 5—Polyhexamethylene adipamide cord | 19.5 |

It can be seen that the novel coating composition applied either as a two coat or one coat system is superior in strength of adhesion to the vinyl pyridine copolymer-resorcinol-formaldehyde dispersion alone.

Example 7

A reaction product of formaldehyde and a composition containing resorcinol and the reaction product of resorcinol and triallyl cyanurate was prepared as follows: 22 parts by weight of resorcinol were placed in a glass lined vessel and heated to 180° C. at which temperature the resorcinol melted. 5.3 parts by weight of triallyl cyanurate were then added and during this addition the temperature was allowed to rise to 225° C. 0.055 part by weight of red lead ($Pb_3O_4$) catalyst were then added. The mixture was kept at 225° C. for 1 hour during which time some allyl alcohol was slowly given off. The mixture was then cooled to 120° C., a reflux condenser was attached to the vessel and 6.2 parts by weight of 37% aqueous formaldehyde were slowly added through the condenser over a period of 20 minutes. The mixture was cooled to 80° C. and a solution containing 6.2 parts by weight of 28-29% aqueous ammonium hydroxide in 86 parts by weight of water was added.

The product was a clear liquid of dark brown colour which tended to turn blue on long exposure to air.

Example 8

A vinyl pyridine copolymer latex-resorcinol-formaldehyde dispersion was prepared as follows:
The following ingredients—

| | Parts by weight |
|---|---|
| Resorcinol | 416 |
| Water | 2814 |
| Formaldehyde | 230 |
| "Gentac" | 4880 | were combined in the following manner: 1014 parts by weight of water were placed in a beaker and the resorcinol was added with stirring. When the resorcinol had dissolved completely, the formaldehyde was added with stirring. This mixture was heated to 75° F. and allowed to stand for 90 minutes at this temperature. The "Gentac" was placed in a separate beaker and 1800 parts by weight of water were added. The resorcinol-formaldehyde-water mixture was added to the "Gentac"-water mixture with stirring. The entire mixture was then allowed to stand for 48 hours at 70° F. before use.

Example 9

A vinyl pyridine copolymer latex resorcinol formaldehyde dispersion was prepared exactly as described in Example 2, but with the following proportions of ingredients:

| | Parts by weight |
|---|---|
| Resorcinol | 229 |
| Water | 2496 |
| Formaldehyde (37%) | 364 |
| Sodium hydroxide (5% in water) | 425 |
| "Gentac" | 3952 |

Example 10

Lengths of polymethylene terephthalate tire cord of a 2 ply 1100 denier construction twisted together with 13 turns per inch in both the singles twisting and plying operations were dipped in a mixture comprising five parts by weight of the solution described in Example 7 and ten parts by weight of the mixture described in Example 8 and treated as follows: the dipped cords were heated for two minutes in a hot air oven at 300° F. while being held under sufficient tension to prevent shrinkage. The cords were then heated for 90 seconds in a hot air oven at 475° F. while being subjected to an imposed stretch of 2.3%, based on untreated cord length.

Example 11

Lengths of polymethylene terephthalate tire cord as described in Example 10 were dipped in the mixture described in Example 9. The cords were then heated as described in Example 10.

Example 12

Lengths of polymethylene terephthalate tire cord as described in Example 10 were dipped in the mixture described in Example 8. The cords were then heated as described in Example 10.

Example 13

Cords prepared as described in Examples 10, 11 and 12 were moulded for 30 minutes at 290° F. into "H" block specimens of natural rubber. The test specimens had the cords embedded in the rubber for a distance of 0.25 inch. The specimens were removed from the mould, cooled to 70° F. and the force required to separate the cords from rubber determined on a Scott Model X-3 tensile tester.

The results were as follows:

| | Force, lbs. |
|---|---|
| Cord prepared as in Example 10 | 23.4 |
| Cord prepared as in Example 11 | 16.6 |
| Cord prepared as in Example 12 | 11.7 |

It can be seen that the novel coating composition described in Example 10 resulted in a marked improvement in cord/rubber adhesion over that achieved with either of the vinyl pyridine copolymer resorcinol-formaldehyde dispersions, described in Examples 8 and 9, alone.

Example 14

Cords prepared as described in Examples 10, 11 and 12 were moulded into rubber tube specimens for the Goodyear Tube Fatigue test as detailed in the American Society for Testing and Materials publication "Tentative Methods of Testing and Tolerances for Tire Cords from Man-Made Fibres" (A.S.T.M. Designation D885-59T). Details of the method for the preparation of test specimens and subsequent testing of these specimens are given on pages 374 to 379. The test specimens prepared from the cords prepared as described in Examples 10, 11 and 12 were tested according to the procedure outlined in the above-mentioned A.S.T.M. publication.

The results were as follows:

|  | Average number of kilocycles to failure of specimens |
|---|---|
| Cords prepared as in Example 10 | 239 |
| Cords prepared as in Example 11 | 72 |
| Cords prepared as in Example 12 | 132 |

It can be seen that the dynamic performance of the cords when bonded to rubber was greatly improved by the use of the novel coating composition described in Example 10.

*Example 15*

2500 grams of resorcinol were weighed into a 12 litre three-necked flask fitted with a stirrer and an electrical heating mantle. 1200 grams of triallyl cyanurate were added and heating of the flask was begun. Stirring was commenced when the flask contents became liquid. The flask was heated to 125° C. and 25 grams of tetraisopropyl titanate were added. Heating of the flask was stopped. After a few minutes the temperautre of the flask rose due to the exothermic reaction and the flask was cooled by means of an air hose so that the temperature did not exceed 225° C. After two hours at 220–225° C. and additional 2500 grams of resorcinol were added to the flask and heating was continued for another two hours.

The flask was then cooled to 130° C. and a reflux condenser and a 500 ml. dropping funnel were fitted. Over a period of several hours 1400 grams of 37% solution of formaldehyde in water were added to the flask by means of the dropping funnel, the rate of addition being adjusted so that only a small amount of formaldehyde issued through the condenser. During this period the flask was cooled by means of an air hose.

1400 grams of 26% aqueous ammonium hydroxide were mixed with 20,000 grams of water in a 5 gallon glass container. Four litres of this ammonium hydroxide solution were added to the reaction flask and the contents of the flask were then mixed with the residue of the ammonium hydroxide solution in the 5 gallon glass container. The resulting solution was dark brown in colour and had a density of 1.26. On prolonged exposure to air the solution became dark blue in colour but this change did not affect the bonding properties.

*Example 16*

Using the equipment described in Example 15 the reaction product of formaldehyde and a composition containing resorcinol and the reaction product of resorcinol and triallyl cyanurate was prepared without the use of a catalyst.

5000 grams of resorcinol was placed in a 12 litre flask and heated to 180° C. 1200 grams of triallyl cyanurate were then added and the reaction mixture was heated for three hours at a temperature between 225° and 250° C.

The flask was then cooled to 130° C. and 1400 grams of 37% aqueous formaldehyde were added to the reaction mixture with cooling so that there was a slight escape of formaldehyde through the condenser.

1400 grams of 26% aqueous ammonium hydroxide were mixed with 20,000 grams of water in a 5 gallon glass container. Four litres of this ammonium hydroxide solution were added to the reaction flask and the flask contents were then mixed with the residue of the ammonium hydroxide solution in the 5 gallon glass container.

It has been found that material prepared without a catalyst is more soluble in aqueous ammonia than catalyzed preparations.

*Example 17*

A latex-resorcinol-formaldehyde dispersion was prepared as follows:

The following ingredients—

|  | Parts by weight |
|---|---|
| Resorcinol | 22.00 |
| Water | 560.00 |
| Formaldehyde (37%) | 35.00 |
| Sodium hydroxide (5% in water) | 60.00 |
| "Gentac" | 300.00 |
| "Pliolite" 2108 | 80.00 | were weighed into a flask in the above order and allowed to stand for 24 hours at room temperature before use.

"Pliolite" 2108 is a styrene-butadiene rubber latex containing

|  | Percent by weight |
|---|---|
| Styrene | 29 |
| Butadiene | 71 |

*Example 18*

Using 6 different phenols a series of 6 reaction products of formaldehyde and a composition containing a phenol and the reaction product of said phenol and triallyl cyanurate were prepared. These products were prepared employing the procedure of Example 15, the ingredients and proportions being the same except that the phenol employed was varied. The product was then mixed with a latex-resorcinol-formaldehyde dispersion (as described in Example 17) in proportion of 2 parts by weight of reaction product to 10 parts by weight of the dispersion. The mixtures were employed to dip lengths of 2 ply polymethylene terephthalate tire cord of approximately 2500 denier.

The cord was dried and heated for 3 minutes at 450° F. while held under tension to prevent shrinkage. The treated cord was then embedded in rubber, the rubber vulcanized and the force required to separate the cords from the rubber determined as in Example 6. The results are shown in Table II.

TABLE II

| Phenol | Force required to separate coated cord from rubber (lbs.) | Remarks |
|---|---|---|
| Phenol |  | Product insoluble in water. |
| Pyrogallol | 30 | Product slowly dissolved in water. |
| Phloroglucinol |  | Did not react with formaldehyde. |
| Hydroquinone | 22.5 | Product only partly soluble in water. |
| Pyrocatechol | 29 | Do. |
| Resorcinol | 30 | Product soluble in water. |

Resorcinol is clearly the most satisfactory phenol to employ.

*Example 19*

A series of compositions was prepared containing a reaction product prepared as in Example 15 but with variation in the relative proportions of resorcinol, triallyl cyanurate and formaldehyde as indicated in Table III. The said reaction product solution was mixed with latex-resorcinol-formaldehyde dispersions as prepared in Example 17 in the ratio of reaction product solution dispersion of 5:10. The reaction product/dispersion compositions were employed to dip lengths of 2 ply polymethylene terephthalate tire cord of approximately 2500 denier.

The cord was dried and heated for 3 minutes at 450° F. while held under tension to prevent shrinkage. The treated cord was then embedded in rubber, the rubber vulcanized and the force required to separate the cords from the rubber determined as in Example 6. The results are shown in Table III.

TABLE III

| | Composition (grams) | | |
|---|---|---|---|
| | A | B | C |
| Resorcinol | 50 | 40 | 30 |
| Triallyl cyanurate | 12 | 12 | 12 |
| Tetraisopropyl titanate | 0.25 | 0.25 | 0.25 |
| Formaldehyde (37%) | 14 | 12 | 10 |
| Reaction product-appearance | Clear liquid | Clear liquid | |
| Ammonium hydroxide (26%) | 14 | 14 | 14 |
| Water | 200 | 200 | 200 |
| Final solution-appearance | Clear | Slight haze | Coagulated |
| Force required to separate from rubber, lbs | 27 | 29 | |

It is clear that reducing the resorcinol/triallyl cyanurate ratio leads to decreasing solubility of the dipping solution.

Example 20

A series of reaction products were prepared employing various proportions of formaldehyde.

500 grams of resorcinol were mixed with 120 grams of triallyl cyanurate, no catalyst being employed. The mixture was heated for 15 minutes at 250° C. and then for three hours at 225° C. The product was divided into 61 gram portions and to each portion under reflux were added different amounts of formaldehyde. The product in each case was dissolved in a solution of 14 grams of 26% ammonium hydroxide in 200 grams of water. The solution was then mixed with rubbery copolymer latex-resorcinol-formaldehyde dispersion of composition described in Example 17, in proportion of 2 parts by weight solution to 10 parts by weight of dispersion. The effectiveness of the mixture in bonding polymethylene terephthalate tire cord to rubber was determined as in Example 6. The results are shown in Table IV.

TABLE IV

| Formaldehyde (38%) grams | Solubility in aqueous ammonium hydroxide | Effect of dilution with water | Force required to separate from rubber (lbs.) |
|---|---|---|---|
| 0 | Clear solution | Precipitates | |
| 4 | do | do | |
| 8 | do | Solution if a little ammonia added | 26 |
| 12 | do | Clear solution | 30 |
| 16 | do | do | 24 |
| 20 | Some coagulation | do | 20 |
| 24 | Coagulates | Coagulated | |

The series of coating compositions illustrated in Table IV were repeated as two coat systems employing as the first coat the specified resorcinol-triallyl cyanurate-formaldehyde reaction product diluted with a ten fold weight of water and as second coat the "Gentac"/"Pliolite" 2108 dispersion of Example 17. The cords were coated by the method of Example 3 and the effectiveness of bonding to rubber determined as in Example 6. The results are shown in Table V.

TABLE V

| Formaldehyde (38%) grams | Solubility in aqueous ammonium hydroxide | Effect of dilution with water | Force required to separate from rubber (lbs.) |
|---|---|---|---|
| 0 | Clear solution | Precipitates | |
| 4 | do | do | |
| 8 | do | Solution if a little ammonia added | 26 |
| 12 | do | Clear solution | 30 |
| 16 | do | do | 31 |
| 20 | Some coagulation | do | 28.5 |
| 24 | Coagulates | Coagulated | |

The range of useful proportions of 38% formaldehyde to resorcinol is from 8:50 to 20:50.

Example 21

A series of mixtures of resorcinol/triallyl cyanurate/formaldehyde reaction product solutions (prepared as in Example 7) with rubbery copolymer latex-resorcinol-formaldehyde dispersions in proportion of 5:10 were made in which the rubbery copolymer latex ingredients were comprised of different proportions of "Gentac" (a 15% styrene, 70% butadiene, 15% vinyl pyridine copolymer latex) and "Pliolite" 2108 (a styrene-butadiene rubber latex), were prepared and the bonding properties between polymethylene terephthalate and rubber were determined as in Example 6. The results are shown in Table VI.

TABLE VI

| "Gentac" | "Pliolite" 2108 | Force required to separate cord from rubber (lbs.) |
|---|---|---|
| 19 | 0 | 23.0 |
| 16 | 3 | 29.0 |
| 13 | 6 | 29.0 |
| 9.5 | 9.5 | 28.0 |
| 5 | 14 | 26.0 |
| 0 | 19 | 24.0 |

Example 22

The use of amines to accelerate the curing of the coating on the polymethylene terephthalate was investigated. The resorcinol/triallyl cyanurate/formaldehyde solution of Example 15 was mixed with the rubbery copolymer latex-resorcinol-formaldehyde dispersion of Example 17 in proportions of 2:10 parts by weight. To the said mixture was added various amounts of a 5% aqueous solution of diethylene triamine. The cure time and temperature and the bonding characteristics are shown in Table VII. The bonding strength was measured by the method described in Example 6.

TABLE VII

| Cure time, sec. | Cure temperature, °F. | Diethylene triamine (5%), parts/12 parts dip | Force required to separate cord from rubber (lbs.) |
|---|---|---|---|
| 90 | 450 | 0 | 23.5 |
| 90 | 450 | 0.50 | 26.5 |
| 90 | 450 | 1.00 | 29.5 |
| 90 | 450 | 1.50 | 29.5+ |
| 90 | 450 | 2.00 | 30.0+ |
| 30 | 450 | 1.00 | 20.0 |
| 60 | 450 | 1.00 | 25.5 |
| 90 | 450 | 1.00 | 30.0+ |
| 120 | 450 | 1.00 | 28.0 |
| 150 | 450 | 1.00 | 28.0 |
| 180 | 450 | 1.00 | 23.5 |

It is to be noted that the dip can be overcured as well as undercured. Although diethylene triamine accelerated the cure it some times caused coagulation of the dip. Such coagulation can be prevented by the addition of a little ammonium hydroxide. Triethylamine diamine was found to be an effective catalyst without causing coagulation of the dip. A similar set of trials with triethylamine diamine are shown in Table VIII.

TABLE VIII

| Cure time, sec. | Cure temperature, °F. | Triethylene diamine (5%), parts/12 parts dip | Force required to separate cord from rubber (lbs.) |
|---|---|---|---|
| 30 | 475 | 1.5 | 26.5 |
| 45 | 475 | 1.5 | 23.0 |
| 105 | 475 | 1.5 | 17.5 |
| 135 | 475 | 1.5 | 14.5 |

It is apparent that overcure is easily obtained. It was observed that the phenomenon of "flaking off" in which the coating flakes off the cord after cure was stopped completely by using triethylamine diamine in the dip.

*Example 23*

A composition was prepared comprising

| | Grams |
|---|---|
| "Gentac"/"Pliolite" 2108 30/8 | 10 |
| Solution of Example 15 | 10 |
| Water | 10 |

The composition was employed to dip lengths of 2 ply polymethylene terephthalate tire cord of approximately 2500 denier. The cord was dried and heated for 3 minutes at 450° F. while held under tension to prevent shrinkage. The treated cord was then embedded in rubber, the rubber vulcanized and the force required to separate the cords from the rubber determined as in Example 6. The force required was 25.5 lbs.

A second composition was prepared comprising

| | Grams |
|---|---|
| "Gentac"/"Pliolite" 2108 30/8 | 10 |
| Solution of Example 15 | 20 |
| Water | 10 |

This composition was employed to coat polymethylene terephthalate tire cord as above in this example. The force required to separate the cords from the rubber was 24.0 lbs. It thus can be seen that the rubbery copolymer latex component when employed without the resorcinol formaldehyde ingredients still provides acceptable bonding in a one coat system.

*Example 24*

A series of 2 ply polymethylene terephthalate tire cords of approximately 2500 denier were coated with the following compositions, dried and heated for 3 minutes at 450° F. while held under tension to prevent shrinkage. The cord was then embedded in rubber, the rubber vulcanized and the force required to separate the cords from the rubber determined as in Example 6. The results are shown in Table IX.

TABLE IX

| Coating composition: | Force required to separate from rubber (lbs.) |
|---|---|
| Latex - resorcinol - formaldehyde dispersion of Example 17 | 22 |
| Dispersion of Example 17 mixed with solution of Example 7 in proportions of 10:5 | 26.5 |
| Two coat system: | |
| First coat—Solution of Example 7 diluted with 20 times weight of water | 32.0 |
| Second coat—Dispersion of Example 17 | --- |

*Example 25*

A latex resorcinol formaldehyde dispersion of the following composition was prepared according to the method listed in Example 17:

| | Parts by weight |
|---|---|
| Resorcinol | 75.9 |
| Water | 3021.1 |
| Formaldehyde (37%) | 123.0 |
| Sodium hydroxide (5% in water) | 142.0 |
| "Gentac" | 2110.0 |
| "Pliolite" 2108 | 528.0 |

*Example 26*

A latex resorcinol formaldehyde dispersion of the following composition was prepared according to the method listed in Example 17:

| | Parts by weight |
|---|---|
| Resorcinol | 123.1 |
| Water | 3025.4 |
| Formaldehyde (37%) | 154.0 |
| Sodium hydroxide (5% in water) | 210.5 |
| "Gentac" | 1990.0 |
| "Pliolite" 2108 | 497.0 |

*Example 27*

Lengths of polymethylene terephthalate tire cord, as described in Example 10, were dipped in a mixture comprising 5 parts by weight of the solution described in Example 7, and 10 parts by weight of the mixture described in Example 25, and treated as follows: the dipped cords were heated for two minutes in a hot-air oven at 200° F. while being held under sufficient tension to prevent shrinkage. The cords were then treated for 45 seconds in a hot-air oven at 490° F. while being held under sufficient tension to prevent shrinkage. The treated cords were then embedded in rubber, the rubber vulcanized and the force required to separate the cords from the rubber determined as in Example 6. The force required was 25.1 lbs.

*Example 28*

Lengths of polymethylene terephthalate tire cord, as described in Example 10, were dipped in a mixture comprising 5 parts by weight of the solution described in Example 7, and 10 parts by weight of the mixture described in Example 26, and treated as described in Example 27. The treated cords were then embedded in rubber, the rubber vulcanized and the force required to separate the cords from the rubber determined as in Example 6. The force required was 25.9 lbs.

What I claim is:

1. A method of reinforcing articles of vulcanizable rubber with fibrous material which comprises applying to the fibrous material a composition comprising about 5 to about 50 parts by weight of an aqueous solution containing from about 60% to 5% by weight of the reaction product of formaldehyde or acetaldehyde with a material derived from the reaction of triallyl cyanurate and a greater than equivalent amount of resorcinol, pyrocatechol, hydroquinone or pyrogallol, wherein the molar ratio of the aldehyde compound to the polyhydric phenolic compound is from about 2:10 to about 6:10, and wherein the reaction of the aldehyde compound with said material is under refluxing conditions, and 50 to 95 parts by weight of a rubbery butadiene copolymer latex, heating the composition after application to the fibrous material, embedding the coated fibrous material in the vulcanizable rubber and vulcanizing the rubber.

2. A method of reinforcing articles of vulcanizable rubber with fibrous material derived from polymethylene terephthalate which comprises applying to the fibrous material a composition comprising from 5 to 50 parts by weight of an aqueous solution containing from 60% to 5% by weight of the reaction product of formaldehyde with a material derived from the reaction of triallyl cyanurate and a greater than equivalent amount of resorcinol wherein the weight ratio of formaldehyde:resorcinol is from about 3:50 to about 8:50 and wherein the reaction of formaldehyde with said material is under refluxing condtiions and 50 to 95 parts by weight of a vinyl pyridine copolymer latex, heating the composition after application to the fibrous material, embedding said coated fibrous material in the vulcanizable rubber and vulcanizing the rubber.

3. A method of reinforcing articles of vulcanizable rubber with fibrous material derived from polyhexamethylene adipamine which comprises applying to the fibrous material a composition comprising from 5 to 50 parts by weight of an aqueous solution containing from 60% to 5% by weight of the reaction product of formaldehyde with a material derived from the reaction of triallyl cyanurate and a greater than equivalent amount of resorcinol wherein the weight ratio of formaldehyde:resorcinol is from about 3:50 to about 8:50 and wherein the reaction of formaldehyde with said material is under refluxing conditions and 50 to 95 parts by weight of a vinyl pyridine copolymer latex, heating the composition after application to the fibrous material, embedding said coated fibrous material in the vulcanizable rubber and vulcanizing the rubber.

4. A method of reinforcing articles of vulcanizable rubber with fibrous material which comprises the steps of applying to the fibrous material a first coating comprising from 5 to 50 parts by weight of an aqueous solution containing from 60% to 5% by weight of the reaction product of formaldehyde or acetaldehyde with a material derived from the reaction of triallyl cyanurate and a greater than equivalent amount of resorcinol, pyrocatechol, hydroquinone or pyrogallol, wherein the molar ratio of the aldehyde compound to the polyhydric phenolic compound is from about 2:10 to about 6:10, and wherein the reaction of the aldehyde with said material is under refluxing conditions, heating the first coating after application to the fibrous material, applying to the coated fibrous material a second coating comprising 50 to 95 parts by weight of a dispersion of a rubbery butadiene copolymer latex in an aqueous alkaline solution of resorcinol and formaldehyde, heating the second coating after application to the coated fibrous material, embedding said coated fibrous material in the vulcanizable rubber and vulcanizing the rubber.

5. A method as claim in claim 1 wherein the rubbery copolymer latex is dispersed in an aqueous alkaline solution of resorcinol and formaldehyde.

6. A method as claimed in claim 1 wherein the composition after application to the fibrous material is cured by heating at a temperature between 150° and 250° C.

7. An adhesive composition adapted to bond fibrous material to vulcanizable rubber which comprises 5 to 50 parts by weight of an aqueous solution containing 60% to 5% by weight of the reaction product of formaldehyde and acetaldehyde with a composition derived from the reaction of triallyl cyanurate and at least a six-fold molar excess of a polyhydric phenol selected from the group consisting of resorcinol, pyrocatechol, hydroquinone and pyrogallol, the reaction of the aldehyde compound and said composition being under refluxing conditions, the molar ratio of aldehyde to phenol being in the range of 2:10 and 6:10, and 50 to 95 parts by weight of a rubbery butadiene copolymer latex.

8. An adhesive composition adapted to bond fibrous material to vulcanizable rubber which comprises 5 to 50 parts by weight of an aqueous solution containing 60% to 5% by weight of the reaction product at refluxing conditions of formaldehyde with a composition derived from the reaction of triallyl cyanurate and at least a six-fold molar excess of resorcinol, the molar ratio of aldehyde to phenol being in the range 2:10 and 6:10, and 50 to 95 parts by weight of a rubbery butadiene copolymer latex.

9. An adhesive composition as claimed in claim 7 wherein the rubbery copolymer latex is selected from the group consisting of styrene-butadiene-vinyl pyridine copolymer latices, styrene-butadiene copolymer latices and mixtures of these.

10. An adhesive composition as claimed in claim 7 wherein the rubbery copolymer latex is dispersed in an aqueous alkaline solution of resorcinol and formaldehyde.

11. An adhesive composition as claimed in claim 7 including an amine curing agent.

12. An adhesive composition which comprises an aqueous solution containing from about 60% to about 5% by weight of the reaction product under refluxing conditions of an aliphatic aldehyde selected from the group consisting of formaldehyde and acetaldehyde with the composition derived from the reaction of triallyl cyanurate and at least a six-fold molar excess of a polyhydric phenol selected from the group consisting of resorcinol, pyrocatechol, hydroquinone and pyrogallol, the molar ratio of the aldehyde compound to the phenolic compound being from about 2:10 to about 6:10.

References Cited by the Examiner
UNITED STATES PATENTS
3,051,594   8/1962   Aitken _____ 156—331

MURRAY TILLMAN, Primary Examiner.

J. C. BLEUTGE, Assistant Examiner.